(12) United States Patent
Byun et al.

(10) Patent No.: US 7,508,751 B2
(45) Date of Patent: Mar. 24, 2009

(54) METHOD AND APPARATUS FOR TRANSMITTING UPLINK FAST FEEDBACK INFORMATION IN AN OFDMA COMMUNICATION SYSTEM

(75) Inventors: Myung-Kwang Byun, Suwon-si (KR); Jae-Ho Jeon, Seongnam-si (KR); Seung-Joo Maeng, Seongnam-si (KR); Jeong-Heon Kim, Anyang-si (KR); Hee-Sang Seo, Seoul (KR); Jeong-Tae Oh, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 645 days.

(21) Appl. No.: 11/142,708

(22) Filed: Jun. 1, 2005

(65) Prior Publication Data

US 2005/0265227 A1 Dec. 1, 2005

(30) Foreign Application Priority Data

Jun. 1, 2004 (KR) ............... 10-2004-0039850

(51) Int. Cl.
*H04J 11/00* (2006.01)
*H04L 27/00* (2006.01)
*H04B 7/00* (2006.01)

(52) U.S. Cl. ............... 370/210; 370/208; 375/259; 455/501

(58) Field of Classification Search ............... 370/208, 370/209, 210, 203, 335, 375, 342, 319, 320, 370/344; 375/259; 455/501
See application file for complete search history.

(56) References Cited

U.S. PATENT DOCUMENTS

| 123,383 | A | * | 2/1872 | Korobkov et al. ............... 416/68 |
| 5,465,269 | A | * | 11/1995 | Schaffner et al. ............... 375/144 |
| 6,373,859 | B1 | * | 4/2002 | Jedwab et al. ............... 370/479 |
| 6,477,210 | B2 | | 11/2002 | Chuang et al. |
| 2001/0008523 | A1 | | 7/2001 | Song |

FOREIGN PATENT DOCUMENTS

| JP | 07-226724 | 8/1995 |
| JP | 2003-264525 | 9/2003 |

OTHER PUBLICATIONS

Leiba et al., "Enhancements to Fast Feedback Sub-Channel", Apr. 28, 2004.
"Draft IEEE Standard for Local and Metropolitan Area Networks, Part 16: Air Interface for Fixed and Broadband Wireless Access Systems", May 13, 2004.

* cited by examiner

*Primary Examiner*—Derrick W Ferris
*Assistant Examiner*—Angel Brockman
(74) *Attorney, Agent, or Firm*—The Farrell Law Firm, PC

(57) ABSTRACT

An apparatus and method for transmitting uplink fast feedback information using a fast feedback channel in an orthogonal frequency division multiple access (OFDMA) communication system. A channel encoder selects information data for uplink fast feedback information, and determines a codeword from a pre-determined codeword set corresponding to the selected information data. A non-coherent modulator chooses transmission symbols by performing orthogonal modulation according to the determined codeword based on a predetermined modulation pattern, and maps the chosen symbols into sub-carriers. An inverse fast Fourier transform (IFFT) block performs an inverse fast Fourier transform (IFFT) on the mapped symbols and transmits the IFFT processed mapped symbols.

2 Claims, 7 Drawing Sheets

| CODEWORD | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| A0 | 0 | 1 | 2 | 3 | 4 | 5 | 6 | 7 | 0 | 1 | 2 | 3 | 4 | 5 | 6 | 7 |
| A1 | 0 | 1 | 2 | 3 | 4 | 5 | 6 | 7 | 1 | 2 | 3 | 4 | 5 | 6 | 7 | 0 |
| A2 | 0 | 1 | 2 | 3 | 4 | 5 | 6 | 7 | 2 | 3 | 4 | 5 | 6 | 7 | 0 | 1 |
| A3 | 0 | 1 | 2 | 3 | 4 | 5 | 6 | 7 | 3 | 4 | 5 | 6 | 7 | 0 | 1 | 2 |
| A4 | 0 | 1 | 2 | 3 | 4 | 5 | 6 | 7 | 4 | 5 | 6 | 7 | 0 | 1 | 2 | 3 |
| A5 | 0 | 1 | 2 | 3 | 4 | 5 | 6 | 7 | 5 | 6 | 7 | 0 | 1 | 2 | 3 | 4 |

FIG.6

| VECTOR INDEX | SUBCARRIER MODULATION PER CODEWORD SUBCARRIER 0, SUBCARRIER 1 . . . SUBCARRIER 7 |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

FIG.7

| CODEWORD | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| A0 | 0 | 1 | 2 | 3 | 4 | 5 | 6 | 7 | 0 | 1 | 2 | 3 | 4 | 5 | 6 | 7 |
| A1 | 0 | 1 | 2 | 3 | 4 | 5 | 6 | 7 | 1 | 2 | 3 | 4 | 5 | 6 | 7 | 0 |
| A2 | 0 | 1 | 2 | 3 | 4 | 5 | 6 | 7 | 2 | 3 | 4 | 5 | 6 | 7 | 0 | 1 |
| A3 | 0 | 1 | 2 | 3 | 4 | 5 | 6 | 7 | 3 | 4 | 5 | 6 | 7 | 0 | 1 | 2 |
| A4 | 0 | 1 | 2 | 3 | 4 | 5 | 6 | 7 | 4 | 5 | 6 | 7 | 0 | 1 | 2 | 3 |
| A5 | 0 | 1 | 2 | 3 | 4 | 5 | 6 | 7 | 5 | 6 | 7 | 0 | 1 | 2 | 3 | 4 |
| CODEWORD | 16 | 17 | 18 | 19 | 20 | 21 | 22 | 23 | 24 | 25 | 26 | 27 | 28 | 29 | 30 | 31 |
| A0 | 4 | 5 | 6 | 7 | 0 | 1 | 2 | 3 | 4 | 5 | 6 | 7 | 0 | 1 | 2 | 3 |
| A1 | 7 | 0 | 1 | 2 | 3 | 4 | 5 | 6 | 6 | 7 | 0 | 1 | 2 | 3 | 4 | 5 |
| A2 | 2 | 3 | 4 | 5 | 6 | 7 | 0 | 1 | 0 | 1 | 2 | 3 | 4 | 5 | 6 | 7 |
| A3 | 5 | 6 | 7 | 0 | 1 | 2 | 3 | 4 | 2 | 3 | 4 | 5 | 6 | 7 | 0 | 1 |
| A4 | 1 | 2 | 3 | 4 | 5 | 6 | 7 | 0 | 5 | 6 | 7 | 0 | 1 | 2 | 3 | 4 |
| A5 | 6 | 7 | 0 | 1 | 2 | 3 | 4 | 5 | 7 | 0 | 1 | 2 | 3 | 4 | 5 | 6 |

FIG.8

| CODEWORD | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| A0 | 0 | 1 | 2 | 3 | 4 | 5 | 6 | 7 | 2 | 3 | 0 | 1 | 6 | 7 | 4 | 5 |
| A1 | 0 | 1 | 2 | 3 | 4 | 5 | 6 | 7 | 4 | 5 | 6 | 7 | 0 | 1 | 2 | 3 |
| A2 | 0 | 1 | 2 | 3 | 4 | 5 | 6 | 7 | 3 | 2 | 1 | 0 | 7 | 6 | 5 | 4 |
| A3 | 0 | 1 | 2 | 3 | 4 | 5 | 6 | 7 | 6 | 7 | 4 | 5 | 2 | 3 | 0 | 1 |
| A4 | 0 | 1 | 2 | 3 | 4 | 5 | 6 | 7 | 7 | 6 | 5 | 4 | 3 | 2 | 1 | 0 |
| A5 | 0 | 1 | 2 | 3 | 4 | 5 | 6 | 7 | 5 | 4 | 7 | 6 | 1 | 0 | 3 | 2 |
| CODEWORD | 16 | 17 | 18 | 19 | 20 | 21 | 22 | 23 | 24 | 25 | 26 | 27 | 28 | 29 | 30 | 31 |
| A0 | 4 | 5 | 6 | 7 | 0 | 1 | 2 | 3 | 3 | 2 | 1 | 0 | 7 | 6 | 5 | 4 |
| A1 | 3 | 2 | 1 | 0 | 7 | 6 | 5 | 4 | 6 | 7 | 4 | 5 | 2 | 3 | 0 | 1 |
| A2 | 6 | 7 | 4 | 5 | 2 | 3 | 0 | 1 | 7 | 6 | 5 | 4 | 3 | 2 | 1 | 0 |
| A3 | 7 | 6 | 5 | 4 | 3 | 2 | 1 | 0 | 5 | 4 | 7 | 6 | 1 | 0 | 3 | 2 |
| A4 | 5 | 4 | 7 | 6 | 1 | 0 | 3 | 2 | 1 | 0 | 3 | 2 | 5 | 4 | 7 | 6 |
| A5 | 1 | 0 | 3 | 2 | 5 | 4 | 7 | 6 | 2 | 3 | 0 | 1 | 6 | 7 | 4 | 5 |
| CODEWORD | 32 | 33 | 34 | 35 | 36 | 37 | 38 | 39 | 40 | 41 | 42 | 43 | 44 | 45 | 46 | 47 |
| A0 | 6 | 7 | 4 | 5 | 2 | 3 | 0 | 1 | 7 | 6 | 5 | 4 | 3 | 2 | 1 | 0 |
| A1 | 7 | 6 | 5 | 4 | 3 | 2 | 1 | 0 | 5 | 4 | 7 | 6 | 1 | 0 | 3 | 2 |
| A2 | 5 | 4 | 7 | 6 | 1 | 0 | 3 | 2 | 1 | 0 | 3 | 2 | 5 | 4 | 7 | 6 |
| A3 | 1 | 0 | 3 | 2 | 5 | 4 | 7 | 6 | 2 | 3 | 0 | 1 | 6 | 7 | 4 | 5 |
| A4 | 2 | 3 | 0 | 1 | 6 | 7 | 4 | 5 | 4 | 5 | 6 | 7 | 0 | 1 | 2 | 3 |
| A5 | 4 | 5 | 6 | 7 | 0 | 1 | 2 | 3 | 3 | 2 | 1 | 0 | 7 | 6 | 5 | 4 |
| CODEWORD | 48 | 49 | 50 | 51 | 52 | 53 | 54 | 55 | 56 | 57 | 58 | 59 | 60 | 61 | 62 | 63 |
| A0 | 5 | 4 | 7 | 6 | 1 | 0 | 3 | 2 | 1 | 0 | 3 | 2 | 5 | 4 | 7 | 6 |
| A1 | 1 | 0 | 3 | 2 | 5 | 4 | 7 | 6 | 2 | 3 | 0 | 1 | 6 | 7 | 4 | 5 |
| A2 | 2 | 3 | 0 | 1 | 6 | 7 | 4 | 5 | 4 | 5 | 6 | 7 | 0 | 1 | 2 | 3 |
| A3 | 4 | 5 | 6 | 7 | 0 | 1 | 2 | 3 | 3 | 2 | 1 | 0 | 7 | 6 | 5 | 4 |
| A4 | 3 | 2 | 1 | 0 | 7 | 6 | 5 | 4 | 6 | 7 | 4 | 5 | 2 | 3 | 0 | 1 |
| A5 | 6 | 7 | 4 | 5 | 2 | 3 | 0 | 1 | 7 | 6 | 5 | 4 | 3 | 2 | 1 | 0 |

FIG.9

METHOD AND APPARATUS FOR TRANSMITTING UPLINK FAST FEEDBACK INFORMATION IN AN OFDMA COMMUNICATION SYSTEM

PRIORITY

This application claims priority under 35 U.S.C. § 119 to an application entitled "Method and Apparatus for Transmitting Uplink Fast Feedback Information in an OFDMA Communication System" filed in the Korean Intellectual Property Office on Jun. 1, 2004 and assigned Serial No. 2004-39850, the contents of which are incorporated herein by reference.

BACKGROUND OF THE INVENTION

1. Field of the Invention

The present invention relates generally to a method and apparatus for transmitting control information in a mobile communication system, and in particular, to a method and apparatus for transmitting fast feedback information, which is a type of uplink control information, in an Orthogonal Frequency Division Multiple Access (OFDMA) communication system.

2. Description of the Related Art

Mobile communication systems have been evolving into a $4^{th}$ generation (4G) mobile communication system supporting a super high-speed multimedia service, following a $1^{st}$ generation (1G) analog system, a $2^{nd}$ generation (2G) digital system, and a $3^{rd}$ generation (3G) IMT-2000 system supporting a high-speed multimedia service. In the 4G mobile communication system, a user can access a satellite network, a local area network (LAN), and an Internet network with one terminal. That is, the user can enjoy many kinds of services, such as voice, image, multimedia, Internet data, voice mail, and instant message services, with one mobile terminal. The 4G mobile communication system aims at a data rate of 20 Mbps for a super high-speed multimedia service, and commonly uses an Orthogonal Frequency Division Multiplexing (OFDM) scheme.

The OFDM scheme, a digital modulation scheme for multiplexing multiple orthogonal carrier signals, divides a single data stream into several low-speed streams and simultaneously transmits the low-speed streams using several subcarriers with a low data rate.

A multiple access scheme using an OFDM scheme is known as an Orthogonal Frequency Division Multiple Access (OFDMA) scheme. In the OFDMA scheme, subcarriers in one OFDM symbol are shared by a plurality of users, i.e., subscriber terminals. A communication system based on the OFDMA scheme (hereinafter referred to as an "OFDMA communication system") has separate physical channels for transmitting uplink fast feedback information, which is a type of uplink control information. The uplink fast feedback information includes a full signal-to-noise ratio (SNR), a per-band differential SNR, fast Multiple Input Multiple Output (MIMO) feedback information, and mode selection feedback information.

FIG. 1 is a diagram illustrating a transmitter for transmitting uplink control information in an OFDMA communication system according to the prior art. Referring to FIG. 1, a transmitter 10 includes a binary channel encoder 11, a modulator 12, and an inverse fast Fourier transform (IFFT) block 13. If there are information data bits for uplink control information to be transmitted, the binary channel encoder 11 encodes the information data bits into a codeword using a binary block code, for example, a (20,5) block code.

The modulator 12 includes a coherent modulator or a differential modulator. The modulator 12 determines a transmission symbol corresponding to the codeword output from the binary channel encoder 11 using a coherent or differential modulation scheme, and outputs the transmission symbol to the IFFT block 13. The modulator 12 can use a predetermined modulation scheme, for example, a Quadrature Phase Shift Keying (QPSK) scheme or a Differential Quadrature Phase Shift Keying (DQPSK) scheme.

The IFFT block 13 performs IFFT on the transmission symbol output from the modulator 12, and transmits the IFFT-processed transmission symbol.

FIG. 2 is a diagram illustrating a receiver for receiving uplink control information in an OFDMA communication system according to the prior art. Referring to FIG. 2, a receiver 20 includes a fast Fourier transform (FFT) block 23, a demodulator 22, and a binary channel decoder 21.

Upon receiving a signal transmitted from the transmitter 10, the FFT block 23 performs FFT on the received signal and outputs a received symbol to the demodulator 22. The demodulator 22 includes a coherent demodulator or a differential modulator. The demodulator 22 receives the received symbol output from the FFT block 23, and calculates a soft decision value thereof using a demodulation scheme corresponding to the modulation scheme used in the transmitter 10, for example, coherent demodulation or differential demodulation.

The binary channel decoder 21 receives the soft decision value calculated by the demodulator 22, determines which codeword was transmitted, and outputs data bits corresponding thereto.

The uplink fast feedback information exchanged between the transmitter 10 and the receiver 20 is not large in the amount for the overall communication services. However, because the uplink fast feedback information is very important information, highly reliable transmission should be guaranteed for the uplink fast feedback information. However, it is common that few frequency-time resources are allocated to physical channels used for transmitting the uplink fast feedback information in order to reduce an overhead rate. Therefore, there is a need for a new transmission method different from the channels to which many resources are allocated and that should transmit a large volume of information, like the traffic channel.

Generally, a combined method of a binary channel code and coherent modulation or differential modulation is used to transmit uplink control information.

However, when the uplink control information is transmitted using less frequency-time resources in this method, an error rate increases, thereby decreasing operation stability of the communication system. That is, while there are pilot tones for downlink or transmission of uplink traffic, there are insufficient traffic tones for transmission of uplink control information. The lack of pilot tones deteriorates channel estimation performance, thereby degrading the performance of a coherent modulation/demodulation scheme.

If the number of pilot tones is increased considering only the channel estimation performance, the number of data tones becomes insufficient. In addition, separation of the binary channel code and the modulation becomes a cause of the failure in optimized performance.

Further, if many frequency-time resources are used for transmission of uplink fast feedback information in order to increase the stability, the overhead rate increases, which reduces throughput of the communication system.

The conventional method of transmitting uplink fast feedback information uses one uplink subchannel and transmits 4-bit information. However, the 4-bit information transmission cannot guarantee sufficient accuracy for transmission of a full SNR and can transmit per-band differential SNRs only for 4 bands. In addition, the 4-bit information transmission lacks operation flexibility, such that it is difficult to freely allocate codewords for transmission of other information, as there are no more than 16 codewords.

SUMMARY OF THE INVENTION

It is, therefore, an object of the present invention to provide a method and apparatus for transmitting uplink fast feedback information using a non-coherent modulation scheme.

It is another object of the present invention to provide a method and apparatus for efficiently transmitting uplink fast feedback information using given frequency-time resources.

It is further another object of the present invention to provide a method and apparatus for efficiently transmitting 5-bit or 6-bit uplink fast feedback information to increase accuracy of control information transmission and operation flexibility in a communication system.

It is yet another object of the present invention to provide an uplink fast feedback information transmission method and apparatus for optimizing performance by combining an M-ary channel code with a non-coherent modulation scheme.

According to another aspect of the present invention, there is provided a method for transmitting uplink fast feedback information using a fast feedback channel in a communication system utilizing an orthogonal frequency division multiple access (OFDMA) scheme. The method includes selecting information data bits for the uplink fast feedback information; determining a codeword from a pre-determined codeword set corresponding to the selected information data; choosing transmission symbols by performing orthogonal modulation according to the determined codeword based on a predetermined modulation pattern; mapping the chosen symbols into sub-carriers; and performing an inverse fast Fourier transform (IFFT) on the mapped symbols and transmitting the IFFT processed mapped symbols.

According to another aspect of the present invention, there is provided a method for transmitting uplink fast feedback information to be used for a fast feedback channel in a communication system utilizing an orthogonal frequency division multiple access (OFDMA) scheme. The method includes selecting five information data bits for the uplink fast feedback information; determining codewords from a predetermined codeword set corresponding to the selected information data bits; choosing transmission symbols by performing orthogonal modulation according to the determined codewords based on a predetermined modulation pattern; mapping the chosen symbols into sub-carriers; and performing an inverse fast Fourier transform (IFFT) on the mapped symbols and transmitting the IFFT processed mapped symbols.

According to further another aspect of the present invention, there is provided a method for transmitting uplink fast feedback information to be used for a fast feedback channel in a communication system utilizing an orthogonal frequency division multiple access (OFDMA) scheme. The method includes selecting six information data bits for the uplink fast feedback information; determining codewords from a predetermined codeword set corresponding to the selected information data bits; choosing transmission symbols by performing orthogonal modulation according to the determined codewords based on a predetermined modulation pattern; mapping the chosen symbols into sub-carriers; and performing inverse fast Fourier transform (IFFT) on the mapped symbols and transmitting the IFFT processed mapped symbols.

According to still another aspect of the present invention, there is provided an apparatus for transmitting uplink fast feedback information using a fast feedback channel in a communication system utilizing an orthogonal frequency division multiple access (OFDMA) scheme. The apparatus includes a channel encoder for selecting information data for uplink fast feedback information, and determining a codeword form a pre-determined codeword set corresponding to the selected information data; a non-coherent modulator for choosing transmission symbols by performing orthogonal modulation according to the determined codeword based on a predetermined modulation pattern, and mapping the chosen symbols into sub-carriers; and an inverse fast Fourier transform (IFFT) block for performing an inverse fast Fourier transform (IFFT) on the mapped symbols and transmitting the IFFT processed mapped symbols.

BRIEF DESCRIPTION OF THE DRAWINGS

The above and other objects, features, and advantages of the present invention will become more apparent from the following detailed description when taken in conjunction with the accompanying drawings in which:

FIG. 6 is a diagram illustrating sixteen possible codewords in an OFDMA communication system according to an embodiment of the present invention;

FIG. 7 is a diagram illustrating orthogonal vectors to be used for orthogonal modulation in a non-coherent modulator according to an embodiment of the present invention;

FIG. 8 is a diagram illustrating thirty-two possible codewords output from an 8-ary channel encoder according to an embodiment of the present invention; and FIG. 9 is a diagram illustrating sixty-four possible codewords output from an 8-ary channel encoder according to another embodiment of the present invention.

DETAILED DESCRIPTION OF THE PREFERRED EMBODIMENT

Several preferred embodiments of the present invention will now be described in detail herein below with reference to the annexed drawings. In the following description, a detailed description of known functions and configurations incorporated herein has been omitted for conciseness.

A method and apparatus proposed in the present invention uses an M-ary channel code and a non-coherent modulation scheme to increase reliability of transmission of uplink fast feedback information, which is a type of uplink control information and to reduce an overhead rate. That is, the present invention relates to a method and apparatus for efficiently transmitting uplink fast feedback information using the M-ary channel code and the non-coherent modulation scheme.

The use of the non-coherent modulation/demodulation scheme reduces the use of frequency-time resources. Therefore, it is possible to efficiently transmit uplink fast feedback information for which many pilot tones cannot be allocated.

The present invention proposes a method for transmitting 5-bit or 6-bit information for transmission of the uplink fast feedback information, thereby increasing accuracy of information transmission and operation flexibility.

As described above, the amount of the uplink fast feedback information used in the communication system is very small. However, the uplink fast feedback information is very important for the communication system. Therefore, the method and apparatus proposed in the present invention uses an orthogonal modulation scheme to transmit the uplink fast feedback information.

Herein, preferred embodiments of the present invention will be described with reference to an Orthogonal Frequency Division Multiple Access (OFDMA) communication system. In addition, a description will be made of a method for transmitting the uplink fast feedback information using an M-ary phase shift keying (PSK) scheme.

Figure 1:
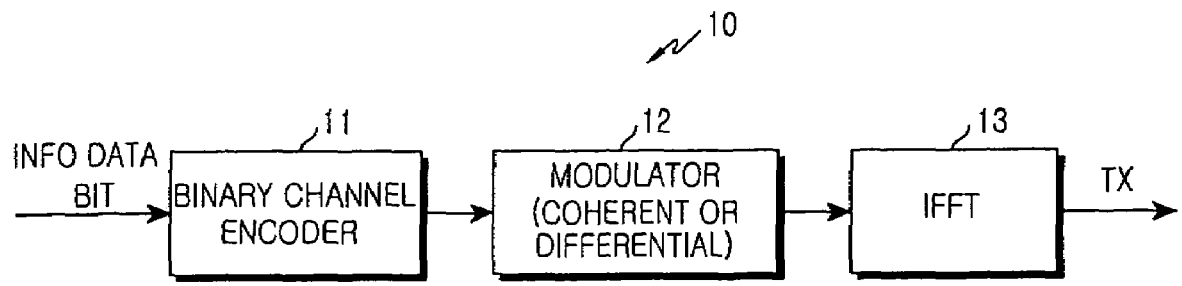
FIG. 1 is a diagram illustrating a transmitter for transmitting uplink control information in an OFDMA communication system according to the prior art.
Figure 2:
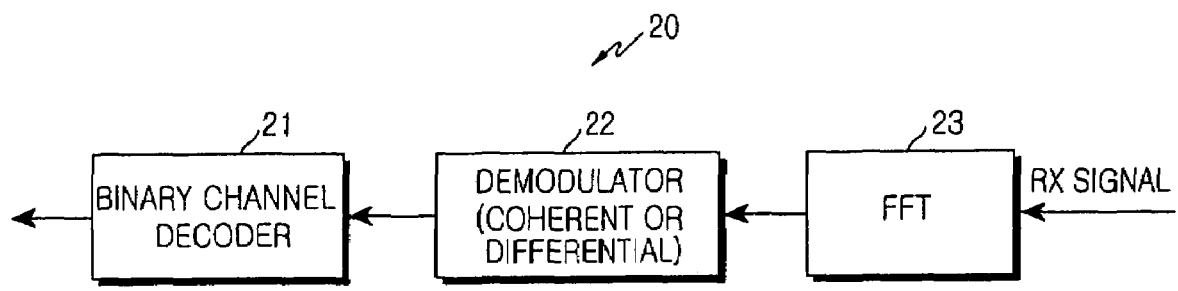
FIG. 2 is a diagram illustrating a receiver for receiving uplink control information in an OFDMA communication system according to the prior art.
Figure 3:
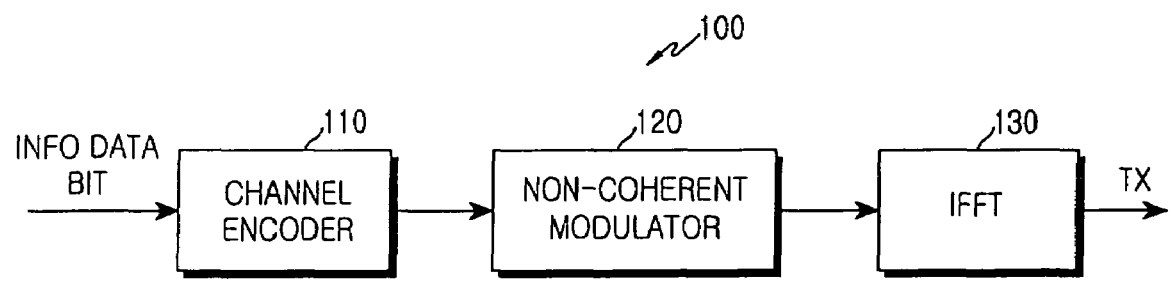
FIG. 3 is a diagram illustrating a transmitter for transmitting uplink fast feedback information in an OFDMA communication system according to an embodiment of the present invention.

FIG. 3 is a diagram illustrating a transmitter for transmitting uplink fast feedback information in an OFDMA communication system according to an embodiment of the present invention. Referring to FIG. 3, a transmitter 100 includes a channel encoder 110 for encoding data bits of uplink control information, for example, uplink fast feedback information, a non-coherent modulator 120 for modulating the information data bits using a non-coherent modulation scheme, and an inverse fast Fourier transform (IFFT) block 130 for performing IFFT on a transmission signal before transmission.

If there are data bits for uplink fast feedback information to be transmitted, the channel encoder 110 encodes the information data bits into a codeword corresponding thereto, and outputs the codeword to the non-coherent modulator 120. The channel encoder 110 can include a binary channel encoder or an M-ary channel encoder that uses M-ary block codes, according to input bits.

The non-coherent modulator 120 determines a transmission symbol corresponding to the codeword output from the channel encoder 110 using the non-coherent modulation scheme, and outputs the transmission symbol to the IFFT block 130. The non-coherent modulator 120 can use a predetermined modulation scheme, for example, an orthogonal modulation scheme.

The IFFT block 130 performs IFFT on the transmission symbol output from the non-coherent modulator 120, and transmits the IFFT-processed transmission symbol.

Figure 4:
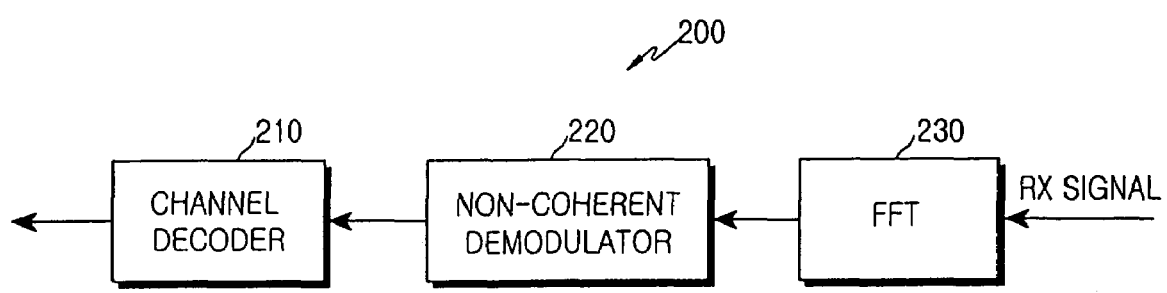
FIG. 4 is a diagram illustrating a receiver for receiving uplink fast feedback information in an OFDMA communication system according to an embodiment of the present invention.

FIG. 4 is a diagram illustrating a receiver for receiving uplink fast feedback information in an OFDMA communication system according to an embodiment of the present invention. Referring to FIG. 4, a receiver 200 includes a fast Fourier transform (FFT) block 230 for performing FFT on a time-domain received signal to convert the time-domain received signal into a frequency-domain received signal, a non-coherent demodulator 220 for demodulating the frequency-domain received signal, and a channel decoder 210 for decoding data bits for the uplink fast feedback information from the demodulated received symbol.

Upon receiving a received signal from the transmitter 100, the FFT block 230 performs FFT on the received signal and outputs a received symbol to the non-coherent demodulator 220. The non-coherent demodulator 220 receives the received symbol output from the FFT block 230, calculates a soft decision value thereof using a non-coherent demodulation scheme, and outputs the soft decision value to the channel decoder 210. The channel decoder 210 receives the soft decision value from the non-coherent demodulator 220, determines which codeword was transmitted from the transmitter 100, and outputs data bits corresponding thereto. The channel decoder 210 can include a binary channel decoder or an M-ary channel decoder according to input bits.

The new method of transmitting uplink fast feedback information, proposed in the present invention, will now be described with reference to the case in which six 3×3 subcarrier clusters in frequency-time domains are allocated in an uplink of an OFDMA communication system.

Figure 5:
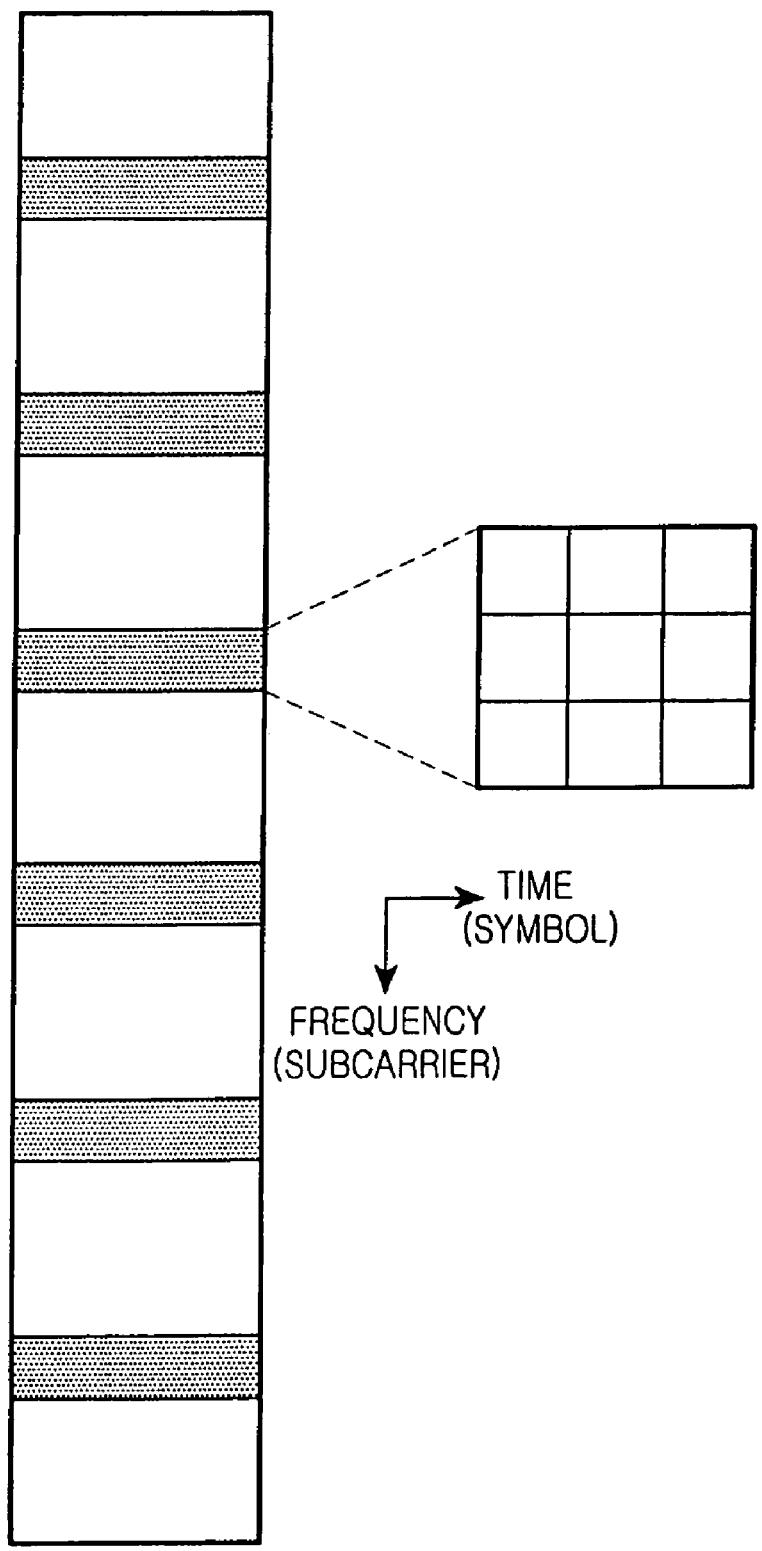
FIG. 5 is a diagram illustrating frequency-time resources allocated for transmission of uplink fast feedback information in an OFDMA communication system according to an embodiment of the present invention.

FIG. 5 is a diagram illustrating frequency-time resources for the case where six 3×3 subcarrier clusters are allocated to a fast feedback channel for transmission of uplink fast feedback information in an OFDMA communication system according to an embodiment of the present invention, FIG. 6 is a diagram illustrating an example of codewords allocated to 3×3 subcarrier clusters in an OFDMA communication system according to an embodiment of the present invention. More specifically, FIG. 5 illustrates frequency-time resources allocated for transmission of uplink fast feedback information according to a pattern to be used for M-ary PSK modulation, wherein the number of information data bits is 4 and an M=8-ary channel encoder is used.

Now, with reference to FIGS. 5 to 7, a description will be made of a method of transmitting 4-bit information data as fast feedback information. Thereafter, with reference to FIGS. 5, 8, and 9, a description will be made of a method for transmitting 5-bit and 6-bit information data as fast feedback information according to an embodiment of the present invention.

Referring to FIG. 5, data bits for uplink fast feedback information to be transmitted are input to a non-coherent modulator through a channel encoder. It is assumed herein that the number of information data bits is 4 and an 8-ary channel encoder is used. The non-coherent modulator modulates the transmission signal using an orthogonal modulation scheme. Modulation symbols output from the non-coherent modulator are subject to IFFT calculation in an IFFT block and then transmitted. The foregoing process of transmitting information data bits will now be described in detail below with reference to FIG. 6.

FIG. 6 illustrates sixteen possible codewords output from an 8-ary channel encoder. Upon receiving the information data bits, the 8-ary channel encoder outputs one of the sixteen possible codewords illustrated in FIG. 6 to the non-coherent modulator. The 8-ary channel encoder is designed such that a minimum Hamming distance between the codewords should be maximized, for the given number of codewords and for a given length. The "Hamming distance" refers to the number of distinct bits among corresponding bits between two codewords. The "minimum Hamming distance" refers to the minimum of all Hamming distances.

In this transmission method, the minimum Hamming distance, which is a main factor affecting codeword error probability performance, is five. That is, for example, for a codeword '0' among the sixteen possible codewords, a pattern of a codeword of A0, A1, A2, A3, A4, and A5 for a subcarrier cluster is '000000', and for a codeword '8', a pattern of a codeword of A0, A1, A2, A3, A4, and A5 for a subcarrier cluster becomes '012345'. As a result, the minimum Hamming distance between the two codewords '0' and '8' becomes five. The minimum Hamming distance=5 indicates that the minimum Hamming distance between two codewords is greater than or equal to five, for all pairs of the possible codewords.

The non-coherent modulator uses an orthogonal modulation scheme for a codeword output from the 8-ary channel encoder. That is, the non-coherent modulator modulates information data bits encoded by the 8-ary channel encoder using the orthogonal modulation scheme. A transmission symbol for a pattern to be used for the modulation is illustrated in FIG. 7.

Referring to FIG. 7, the transmission symbol includes a set of orthogonal vectors, and is directly mapped to the subcarrier cluster. The orthogonal vectors to be used for the orthogonal modulation are represented by, for example, P0, P1, P2 and P3, and the orthogonal modulation symbols, each of which includes QPSK modulation symbols, can be calculated by Equation (1).

$$P0 = \exp\left(j \cdot \frac{\pi}{4}\right)$$
$$P1 = \exp\left(j \cdot \frac{3\pi}{4}\right)$$
$$P2 = \exp\left(-j \cdot \frac{3\pi}{4}\right)$$
$$P3 = \exp\left(-j \cdot \frac{\pi}{4}\right)$$
(1)

The eight edge subcarriers of a 3×3 subcarrier cluster transmit the symbols illustrated in FIG. 7, and the remaining one center subcarrier transmits a pilot symbol. The pilot symbol can be arbitrarily selected. Values of the transmission symbols are set as orthogonal vectors for a corresponding vector index.

More specifically, if 4-bit information data to be transmitted is given, a transmitter determines codewords of A0, A1, A2, A3, A4, and A5, according to FIG. 6. Thereafter, the transmitter allocates an orthogonal vector corresponding to A0 to a first 3×3 subcarrier cluster, and an orthogonal vector corresponding to A1 to a second 3×3 subcarrier cluster, before transmission. Accordingly, the transmitter allocates an orthogonal vector corresponding to A5 to a sixth 3×3 subcarrier cluster, the last subcarrier cluster, and transmits the orthogonal vectors in the method illustrated in FIG. 7.

It can be noted from FIG. 7 that P0, P1, P2, P3, P0, P1, P2, and P3 are set for transmission symbol values corresponding to a vector index 0; P0, P0, P0, P0, P0, P0, P0, and P0 are set for transmission symbol values corresponding to a vector index 4; and P0, P2, P2, P0, P2, P0, P0, and P2 are set for transmission symbol values corresponding to a vector index 7.

Upon receiving a transmission signal transmitted from the transmitter, a receiver performs FFT on the received signal through an FFT block. Subsequently, a non-coherent demodulator in the receiver calculates a square of an absolute value of a correlation value for eight possible orthogonal vectors for each of six 3×3 subcarrier clusters. Thereafter, an M-ary channel decoder in the receiver calculates a sum of squares of absolute values for correlation values of orthogonal vectors corresponding to all of the sixteen possible codewords, and then determines that the information data bits corresponding to a codeword having the maximum value among the codewords was transmitted by the transmitter.

The general uplink fast feedback information transmission method, as described above, transmits 4-bit information using one uplink subchannel. However, the use of four bits cannot guarantee sufficient accuracy for transmission of a full SNR, and can transmit per-band differential SNRs only for four bands. In addition, the 4-bit information transmission lacks in operation flexibility, such that it is difficult to freely allocate codewords for transmission of other information as there are no more than sixteen codewords.

In order to solve the above problems, present invention uses a method of transmitting 5-bit or 6-bit information for transmission of uplink fast feedback information, thereby increasing accuracy of information transmission and operation flexibility.

Now, a description will be made of an uplink fast feedback information transmission method according to an embodiment of the present invention. In FIG. 5, frequency-time resources are allocated when six 3×3 subcarrier clusters in frequency-time domains are allocated to a fast feedback transmission channel. Herein, the number of information data bits is five and an M=8-ary channel encoder is used.

FIG. 8 is a diagram illustrating thirty-two possible codewords output from an 8-ary channel encoder according to an embodiment of the present invention. Referring to FIG. 8, upon receiving the information data bits, the 8-ary channel encoder outputs one of the thirty-two possible codewords to the non-coherent modulator. The 8-ary channel encoder is designed, such that a minimum Hamming distance between the codewords should be maximized, for the given number of codewords and for a given length. It is noted from FIG. 8 that first sixteen codewords are equal to the codewords of FIG. 6 for the 4-bit information transmission and the next sixteen codewords are newly added.

Although the number of the codewords is doubled, the minimum Hamming distance, which is a main factor affecting codeword error probability performance, is still five. That is, for example, for a codeword '16' among the thirty-two possible codewords, a pattern of a codeword of A0, A1, A2, A3, A4, and A5 for a subcarrier cluster is '472516', and for a codeword '24', a pattern of a codeword of A0, A1, A2, A3, A4, and A5 for a subcarrier cluster becomes '460257'. As a result, the minimum Hamming distance between the two codewords '16' and '24' becomes five. The minimum Hamming distance=5 indicates that the minimum Hamming distance between two codewords is greater than or equal to five, for all pairs of the possible codewords.

The non-coherent modulator uses an orthogonal modulation scheme for a codeword output from the 8-ary channel encoder, and orthogonal vectors to be used for the orthogonal modulation are illustrated in FIG. 7. That is, the orthogonal vectors of FIG. 7, for example, P0, P1, P2, and P3, each of which includes QPSK modulation symbols, can be calculated by Equation (1).

The eight edge subcarriers of a 3×3 subcarrier cluster transmit the symbols illustrated in FIG. 7, and the remaining one center subcarrier transmits a pilot symbol. The pilot symbol can be arbitrarily selected.

More specifically, if 5-bit information data to be transmitted is given, a transmitter determines codewords of A0, A1, A2, A3, A4, and A5, according to FIG. 8. Thereafter, the transmitter allocates an orthogonal vector corresponding to A0 to a first 3×3 subcarrier cluster, and an orthogonal vector corresponding to A1 to a second 3×3 subcarrier cluster, before transmission. Accordingly, the transmitter allocates an orthogonal vector corresponding to A5 to a sixth 3×3 subcarrier cluster, the last subcarrier cluster, and transmits the orthogonal vectors in the method illustrated in FIG. 7.

Upon receiving a transmission signal transmitted from the transmitter, a receiver performs FFT on the received signal through an FFT block. Subsequently, a non-coherent demodulator in the receiver calculates a square of an absolute value of a correlation value for eight possible orthogonal vectors for each of six 3×3 subcarrier clusters. Thereafter, an M-ary channel decoder in the receiver calculates a sum of squares of absolute values for correlation values of orthogonal vectors corresponding to all of the thirty-two possible codewords, and then determines that the information data bits corresponding to a codeword having the maximum value among the codewords was transmitted by the transmitter.

As the frequency-time resources, the six 3×3 subcarrier clusters are allocated to a fast feedback transmission channel according to an embodiment of the present invention as illustrated in FIG. 5. Herein, the number of information data bits is six and an M=8-ary channel encoder is used.

FIG. 9 is a diagram illustrating sixty-four possible codewords output from an 8-ary channel encoder according to another embodiment of the present invention. Referring to FIG. 9, upon receiving the information data bits, the 8-ary channel encoder outputs one of the sixty-four possible codewords to the non-coherent modulator. The 8-ary channel encoder is designed such that a minimum Hamming distance between the codewords should be maximized, for the given number of codewords and for a given length.

It is noted from FIG. 9 that the number of the codewords is increased 4 times from the number of the codewords of FIG. 6 for 4-bit information transmission.

Although the number of the codewords is increased four times, the minimum Hamming distance, which is a main factor affecting codeword error probability performance, is still five. That is, for example, for a codeword '32' among the sixty-four possible codewords, a pattern of a codeword of A0, A1, A2, A3, A4, and A5 for a subcarrier cluster is '675124', and for a codeword '41', a pattern of a codeword of A0, A1, A2, A3, A4, and A5 for a subcarrier cluster becomes '640352'. As a result, the minimum Hamming distance between the two codewords '32' and '41' becomes five. The minimum Hamming distance=5 indicates that the minimum Hamming distance between two codewords is greater than or equal to five, for all pairs of the possible codewords.

Alternatively, this transmission method can also transmit five bits using only the first thirty-two codewords out of sixty-four codewords.

The non-coherent modulator uses an orthogonal modulation scheme for a codeword output from the 8-ary channel encoder, and orthogonal vectors to be used for the orthogonal modulation are illustrated in FIG. 7. That is, the orthogonal vectors of FIG. 7, for example, P0, P1, P2, and P3, each of which is comprised of QPSK modulation symbols, can be calculated by Equation (1).

The eight edge subcarriers of a 3×3 subcarrier cluster transmit the symbols illustrated in FIG. 7, and the remaining one center subcarrier transmits a pilot symbol. The pilot symbol can be arbitrarily selected.

More specifically, if 6-bit information data to be transmitted is given, a transmitter determines codewords of A0, A1, A2, A3, A4, and A5, to be allocated to the six subcarrier clusters and transmitted through the codewords illustrated in FIG. 9. Thereafter, the transmitter allocates an orthogonal vector corresponding to A0 to a first 3×3 subcarrier cluster, and an orthogonal vector corresponding to A1 to a second 3×3 subcarrier cluster, before transmission. Similarly, the transmitter allocates an orthogonal vector corresponding to A5 to a sixth 3×3 subcarrier cluster, the last subcarrier cluster, and transmits the orthogonal vectors in the method illustrated in FIG. 7.

Upon receiving a transmission signal transmitted from the transmitter, a receiver performs FFT on the received signal through an FFT block. Subsequently, a non-coherent demodulator in the receiver calculates a square of an absolute value of a correlation value for eight possible orthogonal vectors for each of six 3×3 subcarrier clusters. Thereafter, an M-ary channel decoder in the receiver calculates a sum of squares of absolute values for correlation values of orthogonal vectors corresponding to all of the sixty-four possible codewords, and then determines that the information data bits corresponding to a codeword having the maximum value among the codewords was transmitted by the transmitter.

As can be understood from the foregoing description, when transmitting uplink fast feedback information using given frequency-time resources, the novel transmission method increases the number of transmission information data bits to five or six, making it possible to transmit correct information and operate the system more stably.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for transmitting uplink fast feedback information using a fast feedback channel in a communication system utilizing an orthogonal frequency division multiple access (OFDMA) scheme, the method comprising the steps of:

selecting information data for the uplink fast feedback information;

determining a codeword from a pre-determined codeword set corresponding to the selected information data;

choosing transmission symbols by performing orthogonal modulation according to the determined codeword based on a predetermined modulation pattern;

mapping the chosen transmission symbols into sub-carriers;

performing an inverse fast Fourier transform (IFFT) on the mapped symbols; and transmitting the IFFT processed mapped symbols, wherein the determined codeword indicates a set of orthogonal vectors to be used for the orthogonal modulation, and the predetermined modulation pattern is represented by P0, P1, P2, and P3, each of which indicates a quadrature phase shift keying (OPSK) modulation symbol that are expressed by:

$$P0 = \exp\left(j \cdot \frac{\pi}{4}\right)$$

$$P1 = \exp\left(j \cdot \frac{3\pi}{4}\right)$$

$$P2 = \exp\left(-j \cdot \frac{3\pi}{4}\right)$$

$$P3 = \exp\left(-j \cdot \frac{\pi}{4}\right),$$

wherein the set of orthogonal vectors includes 6 orthogonal vectors from among a predetermined orthogonal vector set, the predetermined orthogonal vector set is represented by:

| VECTOR INDEX | Subcarrier modulation per codeword subcarrier 0, subcarrier 1, . . . , subcarrier 7 |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 | where each of the P0, P1, P2, and P3 is the OPSK modulation symbol, and
wherein the pre-determined codeword set is defined by:

| Codeword | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| A0 | 0 | 1 | 2 | 3 | 4 | 5 | 6 | 7 | 2 | 3 | 0 | 1 | 6 | 7 | 4 | 5 |
| A1 | 0 | 1 | 2 | 3 | 4 | 5 | 6 | 7 | 4 | 5 | 6 | 7 | 0 | 1 | 2 | 3 |
| A2 | 0 | 1 | 2 | 3 | 4 | 5 | 6 | 7 | 3 | 2 | 1 | 0 | 7 | 6 | 5 | 4 |
| A3 | 0 | 1 | 2 | 3 | 4 | 5 | 6 | 7 | 6 | 7 | 4 | 5 | 2 | 3 | 0 | 1 |
| A4 | 0 | 1 | 2 | 3 | 4 | 5 | 6 | 7 | 7 | 6 | 5 | 4 | 3 | 2 | 1 | 0 |
| A5 | 0 | 1 | 2 | 3 | 4 | 5 | 6 | 7 | 5 | 4 | 7 | 6 | 1 | 0 | 3 | 2 |

| Codeword | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| A0 | 4 | 5 | 6 | 7 | 0 | 1 | 2 | 3 | 3 | 2 | 1 | 0 | 7 | 6 | 5 | 4 |
| A1 | 3 | 2 | 1 | 0 | 7 | 6 | 5 | 4 | 6 | 7 | 4 | 5 | 2 | 3 | 0 | 1 |
| A2 | 6 | 7 | 4 | 5 | 2 | 3 | 0 | 1 | 7 | 6 | 5 | 4 | 3 | 2 | 1 | 0 |
| A3 | 7 | 6 | 5 | 4 | 3 | 2 | 1 | 0 | 5 | 4 | 7 | 6 | 1 | 0 | 3 | 2 |
| A4 | 5 | 4 | 7 | 6 | 1 | 0 | 3 | 2 | 1 | 0 | 3 | 2 | 5 | 4 | 7 | 6 |
| A5 | 1 | 0 | 3 | 2 | 5 | 4 | 7 | 6 | 2 | 3 | 0 | 1 | 6 | 7 | 4 | 5 |

| Codeword | 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|---|
| A0 | 6 | 7 | 4 | 5 | 2 | 3 | 0 | 1 | 7 | 6 | 5 | 4 | 3 | 2 | 1 | 0 |
| A1 | 7 | 6 | 5 | 4 | 3 | 2 | 1 | 0 | 5 | 4 | 7 | 6 | 1 | 0 | 3 | 2 |
| A2 | 5 | 4 | 7 | 6 | 1 | 0 | 3 | 2 | 1 | 0 | 3 | 2 | 5 | 4 | 7 | 6 |
| A3 | 1 | 0 | 3 | 2 | 5 | 4 | 7 | 6 | 2 | 3 | 0 | 1 | 6 | 7 | 4 | 5 |
| A4 | 2 | 3 | 0 | 1 | 6 | 7 | 4 | 5 | 4 | 5 | 6 | 7 | 0 | 1 | 2 | 3 |
| A5 | 4 | 5 | 6 | 7 | 0 | 1 | 2 | 3 | 3 | 2 | 1 | 0 | 7 | 6 | 5 | 4 |

| Codeword | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|
| A0 | 5 | 4 | 7 | 6 | 1 | 0 | 3 | 2 | 1 | 0 | 3 | 2 | 5 | 4 | 7 | 6 |
| A1 | 1 | 0 | 3 | 2 | 5 | 4 | 7 | 6 | 2 | 3 | 0 | 1 | 6 | 7 | 4 | 5 |
| A2 | 2 | 3 | 0 | 1 | 6 | 7 | 4 | 5 | 4 | 5 | 6 | 7 | 0 | 1 | 2 | 3 |
| A3 | 4 | 5 | 6 | 7 | 0 | 1 | 2 | 3 | 3 | 2 | 1 | 0 | 7 | 6 | 5 | 4 |
| A4 | 3 | 2 | 1 | 0 | 7 | 6 | 5 | 4 | 6 | 7 | 4 | 5 | 2 | 3 | 0 | 1 |
| A5 | 6 | 7 | 4 | 5 | 2 | 3 | 0 | 1 | 7 | 6 | 5 | 4 | 3 | 2 | 1 | 0 | where a total number of the codewords is 64 expressed by 6 bits, the codewords being designed such that a minimum Hamming distance between the codewords is at least equal to 5, and each of the A0, A1, A2, A3, A4, and A5 represents a vector index in the predetermined orthogonal vector set.

2. An apparatus for transmitting uplink fast feedback information using a fast feedback channel in a communication system utilizing an orthogonal frequency division multiple access (OFDMA) scheme, the apparatus comprising:
a channel encoder for selecting information data for the uplink fast feedback information, and determining a codeword from a pre-determined codeword set corresponding to the selected information data;
a non-coherent modulator for choosing transmission symbols by performing orthogonal modulation according to the determined codeword based on a predetermined modulation pattern, and mapping the chosen transmission symbols into sub-carriers; and
an inverse fast Fourier transform (IFFT) block for performing IFFT on the mapped symbols and transmitting the IFFT processed mapped symbols,
wherein the determined codeword indicates a set of orthogonal vectors to be used for the orthogonal modulation, and the predetermined modulation pattern is represented by P0, P1, P2, and P3, each of which indicates a quadrature phase shift keying (OPSK) modulation symbol that are expressed by:

$$P0 = \exp\left(j \cdot \frac{\pi}{4}\right)$$

-continued $$P1 = \exp\left(j \cdot \frac{3\pi}{4}\right)$$

$$P2 = \exp\left(-j \cdot \frac{3\pi}{4}\right)$$

$$P3 = \exp\left(-j \cdot \frac{\pi}{4}\right),$$

wherein the set of orthogonal vectors includes 6 orthogonal vectors from among a predetermined orthogonal vector set, the predetermined orthogonal vector set is represented by:

| VECTOR INDEX | Subcarrier modulation per codeword subcarrier 0, subcarrier 1, ..., subcarrier 7 |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 | where each of the P0, P1, P2, and P3 is the OPSK modulation symbol, and
wherein the pre-determined codeword set is defined by:

| Codeword | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| A0 | 0 | 1 | 2 | 3 | 4 | 5 | 6 | 7 | 2 | 3 | 0 | 1 | 6 | 7 | 4 | 5 |
| A1 | 0 | 1 | 2 | 3 | 4 | 5 | 6 | 7 | 4 | 5 | 6 | 7 | 0 | 1 | 2 | 3 |
| A2 | 0 | 1 | 2 | 3 | 4 | 5 | 6 | 7 | 3 | 2 | 1 | 0 | 7 | 6 | 5 | 4 |
| A3 | 0 | 1 | 2 | 3 | 4 | 5 | 6 | 7 | 6 | 7 | 4 | 5 | 2 | 3 | 0 | 1 |
| A4 | 0 | 1 | 2 | 3 | 4 | 5 | 6 | 7 | 7 | 6 | 5 | 4 | 3 | 2 | 1 | 0 |
| A5 | 0 | 1 | 2 | 3 | 4 | 5 | 6 | 7 | 5 | 4 | 7 | 6 | 1 | 0 | 3 | 2 |

| Codeword | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| A0 | 4 | 5 | 6 | 7 | 0 | 1 | 2 | 3 | 3 | 2 | 1 | 0 | 7 | 6 | 5 | 4 |
| A1 | 3 | 2 | 1 | 0 | 7 | 6 | 5 | 4 | 6 | 7 | 4 | 5 | 2 | 3 | 0 | 1 |
| A2 | 6 | 7 | 4 | 5 | 2 | 3 | 0 | 1 | 7 | 6 | 5 | 4 | 3 | 2 | 1 | 0 |
| A3 | 7 | 6 | 5 | 4 | 3 | 2 | 1 | 0 | 5 | 4 | 7 | 6 | 1 | 0 | 3 | 2 |
| A4 | 5 | 4 | 7 | 6 | 1 | 0 | 3 | 2 | 1 | 0 | 3 | 2 | 5 | 4 | 7 | 6 |
| A5 | 1 | 0 | 3 | 2 | 5 | 4 | 7 | 6 | 2 | 3 | 0 | 1 | 6 | 7 | 4 | 5 |

| Codeword | 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|---|
| A0 | 6 | 7 | 4 | 5 | 2 | 3 | 0 | 1 | 7 | 6 | 5 | 4 | 3 | 2 | 1 | 0 |
| A1 | 7 | 6 | 5 | 4 | 3 | 2 | 1 | 0 | 5 | 4 | 7 | 6 | 1 | 0 | 3 | 2 |
| A2 | 5 | 4 | 7 | 6 | 1 | 0 | 3 | 2 | 1 | 0 | 3 | 2 | 5 | 4 | 7 | 6 |
| A3 | 1 | 0 | 3 | 2 | 5 | 4 | 7 | 6 | 2 | 3 | 0 | 1 | 6 | 7 | 4 | 5 |
| A4 | 2 | 3 | 0 | 1 | 6 | 7 | 4 | 5 | 4 | 5 | 6 | 7 | 0 | 1 | 2 | 3 |
| A5 | 4 | 5 | 6 | 7 | 0 | 1 | 2 | 3 | 3 | 2 | 1 | 0 | 7 | 6 | 5 | 4 |

| Codeword | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|
| A0 | 5 | 4 | 7 | 6 | 1 | 0 | 3 | 2 | 1 | 0 | 3 | 2 | 5 | 4 | 7 | 6 |
| A1 | 1 | 0 | 3 | 2 | 5 | 4 | 7 | 6 | 2 | 3 | 0 | 1 | 6 | 7 | 4 | 5 |
| A2 | 2 | 3 | 0 | 1 | 6 | 7 | 4 | 5 | 4 | 5 | 6 | 7 | 0 | 1 | 2 | 3 |
| A3 | 4 | 5 | 6 | 7 | 0 | 1 | 2 | 3 | 3 | 2 | 1 | 0 | 7 | 6 | 5 | 4 |
| A4 | 3 | 2 | 1 | 0 | 7 | 6 | 5 | 4 | 6 | 7 | 4 | 5 | 2 | 3 | 0 | 1 |
| A5 | 6 | 7 | 4 | 5 | 2 | 3 | 0 | 1 | 7 | 6 | 5 | 4 | 3 | 2 | 1 | 0 | where a total number of the codewords is 64 expressed by 6 bits, the codewords being designed such that a minimum Hamming distance between the codewords is at least equal to 5, and each of the A0, A1, A2, A3, A4, and A5 represents a vector index in the predetermined orthogonal vector set.

* * * * *